US010380966B2

(12) United States Patent
Dey et al.

(10) Patent No.: US 10,380,966 B2
(45) Date of Patent: Aug. 13, 2019

(54) POWER AND PROCESSOR MANAGEMENT FOR A PERSONAL IMAGING SYSTEM

(71) Applicant: International Business Machines Corporation, Armonk, NY (US)

(72) Inventors: Prasenjit Dey, Bangalore (IN); Vijay Ekambaram, Tamilnadu (IN); Saravanan Sadacharam, Chennai (IN)

(73) Assignee: International Business Machines Corporation, Armonk, NY (US)

(*) Notice: Subject to any disclaimer, the term of this patent is extended or adjusted under 35 U.S.C. 154(b) by 24 days.

(21) Appl. No.: 14/840,538

(22) Filed: Aug. 31, 2015

(65) Prior Publication Data
US 2017/0061920 A1 Mar. 2, 2017

(51) Int. Cl.
G09G 5/00 (2006.01)

(52) U.S. Cl.
CPC ....... *G09G 5/001* (2013.01); *G09G 2330/021* (2013.01)

(58) Field of Classification Search
CPC .......... G06T 19/006; G06T 3/40; H04B 7/00; G06F 3/16; G06F 3/0482; G06F 3/40; G06F 3/012; H04N 13/0239; H04N 13/044
USPC ............................................ 345/8, 158, 633
See application file for complete search history.

(56) References Cited

U.S. PATENT DOCUMENTS 8,223,024 B1* 7/2012 Petrou .................. G02B 27/017
340/573.1

9,171,198 B1* 10/2015 Raffle ................ G06K 9/00281
2011/0157365 A1* 6/2011 Sato ..................... G02B 27/017
348/158

(Continued)

FOREIGN PATENT DOCUMENTS

CA        2556995 A1     10/2005
EP        1914634 A1     4/2008
(Continued)

OTHER PUBLICATIONS

Roesner et al. "World-Driven Access Control for Continuous Sensing", Microsoft Research Tech Report MSR-TR-2014-67, May 2014.

(Continued)

*Primary Examiner* — Jennifer Mehmood
*Assistant Examiner* — James S Nokham
(74) *Attorney, Agent, or Firm* — Brown & Michaels, PC; David Woycechowsky

(57) ABSTRACT

Power-efficient data collection by a personal imaging device regarding a user's interaction with an application on a mobile device by automatically switching on and off costly, power-consuming applications of the personal imaging device without the use of a radio signal. The personal imaging device detects a visual start signal displayed on the mobile device of a tagged application on the mobile device. The personal imaging device activates sensors of the personal imaging device for collecting data regarding the user's interaction with the application on the mobile device. The personal imaging device collects data regarding the user's interaction with the application on the mobile device via the activated sensors and stores the data in a repository. The personal imaging device detects a visual end signal displayed on the mobile device, ending data collection.

24 Claims, 7 Drawing Sheets

(56) References Cited

U.S. PATENT DOCUMENTS

| | | | | |
|---|---|---|---|---|
| 2011/0249122 | A1* | 10/2011 | Tricoukes | G02B 27/017 348/158 |
| 2013/0017789 | A1* | 1/2013 | Chi | G02B 27/01 455/41.2 |
| 2013/0187835 | A1* | 7/2013 | Vaught | G06K 9/00604 345/8 |
| 2014/0267403 | A1* | 9/2014 | Maciocci | G06T 19/006 345/633 |
| 2015/0015459 | A1* | 1/2015 | Cho | G02B 27/017 345/8 |
| 2015/0084862 | A1* | 3/2015 | Sugihara | G09G 5/00 345/156 |
| 2015/0348327 | A1* | 12/2015 | Zalewski | G06F 3/01 345/419 |
| 2016/0054802 | A1* | 2/2016 | Dickerson | G06F 3/017 345/158 |
| 2016/0189341 | A1* | 6/2016 | Balarajashetty | H04N 13/0239 348/48 |
| 2016/0299641 | A1* | 10/2016 | Lebeau | G06F 3/16 |
| 2016/0328021 | A1* | 11/2016 | Lee | G06F 3/011 |
| 2016/0350971 | A1* | 12/2016 | Athey | H04W 76/10 |
| 2017/0206688 | A1* | 7/2017 | Chun | G02B 27/02 |

FOREIGN PATENT DOCUMENTS

| | | |
|---|---|---|
| WO | 2012116304 A2 | 8/2012 |
| WO | 2012125157 A1 | 9/2012 |

OTHER PUBLICATIONS

Mayberry et al. "iShadow: Design of a Wearable, Real-Time Mobile Gaze Tracker", 12th International Conference on Mobile Systems, Applications, and Services. 2014.

Liu et al. "An Energy-Efficient Data Collection Framework for Wireless Sensor Networks by Exploiting Spatiotemporal Correlation", IEEE Transactions on Parallel and Distributed Systems, vol. 18, No. 7, Jul. 2007.

Yeo et al. "An Energy-Efficient Sequence-Aware Top-k Monitoring Scheme in Wireless Sensor Networks", Hindawi Publishing Corporation, International Journal of Distributed Sensor Networks, vol. 2013, Article ID 684503, 13 pages, Oct. 2013.

Jiankun, O. "Energy-Efficient Data Processing Scheme in Sensor Networks", Journal of Networks, vol. 8, No. 7, Jul. 2013.

Ashok et al. "Capacity of Pervasive Camera Based Communication Linder Perspective Distortions", IEEE International Conference on Pervasice Computing and Communications, Mar. 2014.

Ashok, A. "Camera Based Communications" Design, Modeling and Analysis of Visual MIMO Communication, Rutgers University, Oct. 2014.

Kolakowska et al. "Emotion Recognition and its Application in Software Engineering", 6th International Conference on Human System Interaction, Jun. 2013.

Chynal et al. "Using Eyetracking in a Mobile Applications Usability Testing", Intelligent Information and Database Systems, Lecture Notes in Computer Science vol. 7198, pp. 178-186, 2012.

Gruebler, A. et al. "Measurement of distal EMG Signals using a Wearable Device for Reading Facial Expressions", 32nd Annual International Conference of the IEEE EMBS, Sep. 2010.

Scheirer et al. "Expression Glasses a Wearable Device for Facial Expression Recognition", M.I.T Media Laboratory Perceptual Computing Section Technical Report No. 484, 1999.

Schultz et al. "Towards Detecting Cognitive Load and Emotions in Usability Studies Using the RealEYES Framework", Usability and Internationalization, Part I, HCII 2007, LNCS 4559, pp. 412-421, 2007.

"We are YouEye, the Human Side of Data", https://www.youeye.com/, at least as early as Jan. 2012.

"Usability testing and eye tracking", http://www.tobii.com/en/eye-tracking-research/global/research/usability/; at least as early as Jan. 2013.

* cited by examiner

POWER AND PROCESSOR MANAGEMENT FOR A PERSONAL IMAGING SYSTEM

BACKGROUND

The present invention relates to a personal imaging system, and more specifically to power and processor management for a personal imaging system.

Personal imaging systems are wearable computers. Personal imaging systems may use an optical head-mounted display (OHMD) or computerized internet-connected glasses with transparent heads-up display (HUD) or augmented reality (AR) overlay that has the capability of reflecting projected digital images, which can be seen through by the user.

The personal imaging system may collect information from internal or external sensors. Some of the sensors may track movement of the user's gaze or head, acceleration, temperature, pupil movement, facial expression, and other conditions which can use significant processing power. Input to the personal imaging system may be accomplished through buttons, touchpad, compatible devices for remote control, speech recognition of commands issued by the user, gesture recognition, eye tracking and brain-computer interface.

Additionally, the personal imaging system may control, or retrieve data from, other instruments or computers, for example through wireless radio technologies. The personal imaging system may also contain a storage device.

It should be noted that connecting the personal imaging system to another device via wireless radio technologies uses significant electrical power from both the personal imaging system and the device in which it is connected to. This can be problematic if the data collection is longer than a few hours.

One example in which data collection is used for an extended period of time is for mobile application usability testing. Usability testing is used to determine actual user experience when the user interacts with the application on a mobile device. Since the data provided by users sitting in an artificial setting in which a document camera is pointed directly at the user's face can be skewed depending on the level of comfort by the user, instead personal imaging systems have been used to obtain data from a user. The usability data is provided by information from motion sensors, microphones, environmental sensors and optical sensors of the personal imaging system. However, in order to obtain this data regarding usability, the user has to manually start and stop the usability testing which can also skew the data collected. Furthermore, the personal imaging system has to be connected to and synced with the mobile device in which the application is displayed in order to correlate the data collection with specific portions of the application being tested which uses significant power and processing resources of both the personal imaging device and mobile device.

SUMMARY

According to one embodiment of the present invention, a method of data collection by a personal imaging device regarding a user's interaction with an application on a mobile device is disclosed. The method comprising the steps of: the personal imaging device detecting a visual start signal displayed on the mobile device; the personal imaging device activating sensors of the personal imaging device for collecting data regarding the user's interaction with the application on the mobile device; the personal imaging device collecting data regarding the user's interaction with the application on the mobile device via the activated sensors and storing the data in a repository; and the personal imaging device detecting a visual end signal displayed on the mobile device.

According to another embodiment of the present invention, a method of minimizing power resources of a personal imaging device regarding a user's interaction with an application on a mobile device is disclosed. The method comprising the steps of: the personal imaging device detecting a visual start signal displayed on the mobile device; the personal imaging device activating processing and resource intensive program regarding the user's interaction with the application on the mobile device; and the personal imaging device detecting a visual end signal displayed on the mobile device, ending the processing and resource intensive program.

According to another embodiment of present invention, a computer program product for data collection by a personal imaging device regarding a user's interaction with an application on a mobile device, the personal imaging system comprising at least one processor, one or more memories, one or more computer readable storage media, a plurality of sensors, the computer program product comprising a computer readable storage medium having program instructions embodied therewith. The program instructions executable by the computer to perform a method comprising: detecting, by the personal imaging device, a visual start signal displayed on the mobile device; activating, by the personal imaging device, sensors of the personal imaging device for collecting data regarding the user's interaction with the application on the mobile device; collecting, by the personal imaging device, data regarding the user's interaction with the application on the mobile device via the activated sensors and storing the data in a repository; and detecting, by the personal imaging device, a visual end signal displayed on the mobile device.

According to another embodiment of present invention, a computer program product for data collection by a personal imaging device regarding a user's interaction with an application on a mobile device, the personal imaging system comprising at least one processor, one or more memories, one or more computer readable storage media, a plurality of sensors, the computer program product comprising a computer readable storage medium having program instructions embodied therewith. The program instructions executable by the computer to perform a method comprising: detecting, by the personal imaging device, a visual start signal displayed on the mobile device; activating, by the personal imaging device, a processing and resource intensive program regarding the user's interaction with the application on the mobile device; and detecting, by the personal imaging device, a visual end signal displayed on the mobile device, ending the processing and resource intensive program.

According to one embodiment of the present invention, a personal imaging computer system for data collection by a personal imaging device regarding a user's interaction with an application on a mobile device is disclosed. The personal imaging computer system comprising a personal imaging device computer comprising at least one processor, one or more memories, a plurality of sensors, one or more computer readable storage media having program instructions executable by the computer to perform the program instructions comprising: detecting, by the personal imaging device, a visual start signal displayed on the mobile device; activating, by the personal imaging device, sensors of the personal imaging device for collecting data regarding the user's interaction with the application on the mobile device; collecting, by the personal imaging device, data regarding the user's interaction with the application on the mobile device via the activated sensors and storing the data in a repository; and detecting, by the personal imaging device, a visual end signal displayed on the mobile device.

According to one embodiment of the present invention, a personal imaging computer system for data collection by a personal imaging device regarding a user's interaction with an application on a mobile device is disclosed. The personal imaging computer system comprising a personal imaging device computer comprising at least one processor, one or more memories, a plurality of sensors, one or more computer readable storage media having program instructions executable by the computer to perform the program instructions comprising: detecting, by the personal imaging device, a visual start signal displayed on the mobile device; activating, by the personal imaging device, a processing and resource intensive program regarding the user's interaction with the application on the mobile device; and detecting, by the personal imaging device, a visual end signal displayed on the mobile device, ending the processing and resource intensive program.

DETAILED DESCRIPTION

In an illustrative embodiment, it is recognized that the methods, computer program product and computer system may be implemented through a personal imaging system of a user which collects information from internal or external sensors. The personal imaging system contains a storage device or repository. Input to the personal imaging system may be accomplished through buttons, touchpad, compatible devices for remote control, speech recognition of commands issued by the user, gesture recognition, eye tracking or brain-computer interface. A processor, connected to the internal and external sensors, executes software which aids in collection and analyzation of the information from the sensors.

In another illustrative embodiment, it is recognized that the personal imaging system is not connected to the mobile device through a wireless radio technology or is not "radio linked" during data collection. The term "radio-linked" referring to technologies that link one device to another through a radio frequency band. By not requiring connectivity between the personal imaging system and the mobile device for data collection, there is minimal drain on the mobile device's battery and the battery of the personal imaging system, reducing power and processor resources.

For programs or tasks which require significant or greater than a preset amount of processor power the programs may be initiated or halted through visual start and end signals, limiting the processor and power resources used. For example, data collection by the personal imaging system of a user's interaction with an application of a mobile device may be initiated through capture of a visual start signal such as a QR code displayed on the mobile device. Similarly, data collection may be halted through the capture of a visual end signal such as a QR code displayed on the mobile device. The data collection start and stop point are temporally separated. As a result, it will be recognized that limited user interaction by the user is required to initiate or halt any data collection, since this is done through the display by the mobile device of the visual start and end signals.

Figure 1:
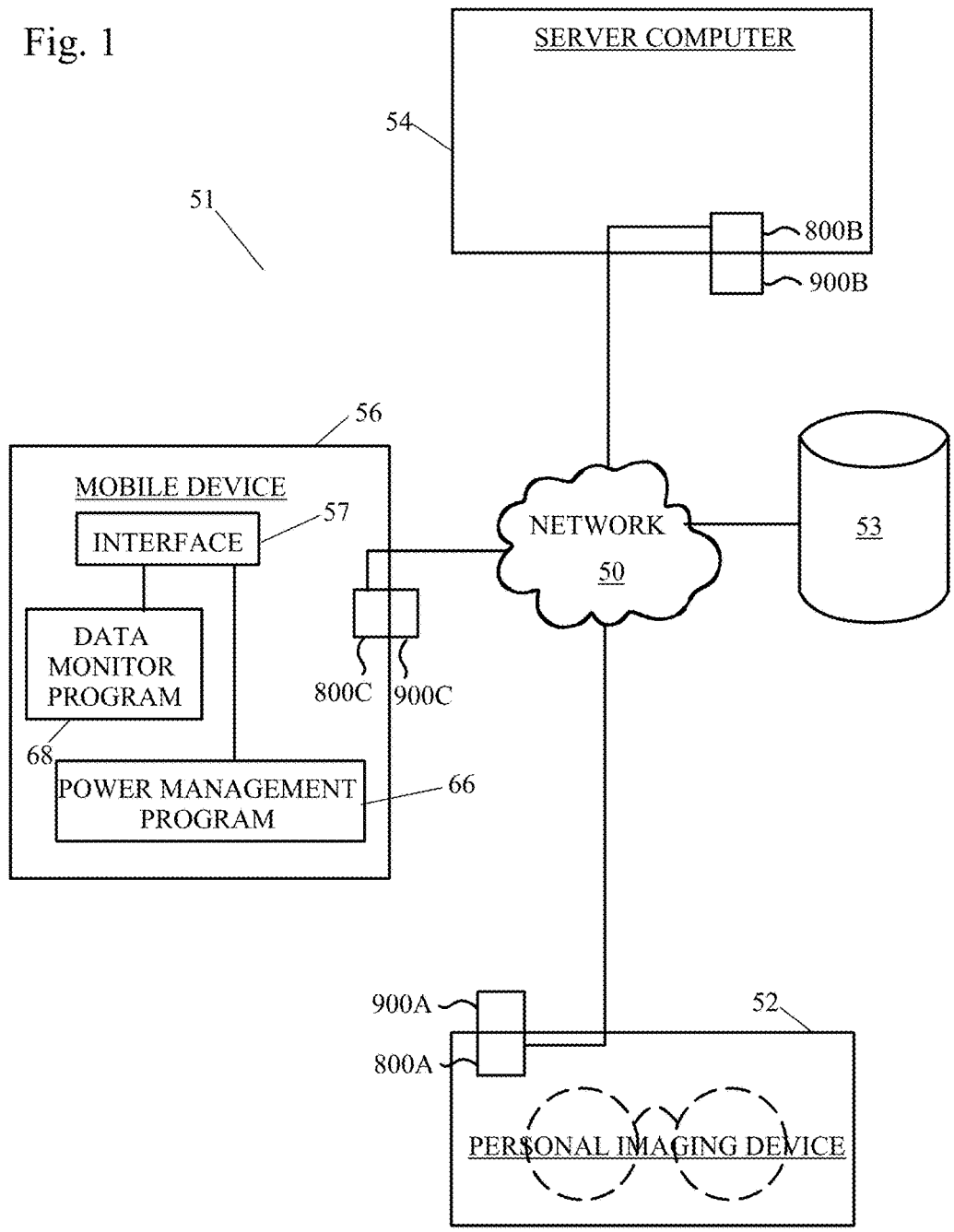
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Figure 4:
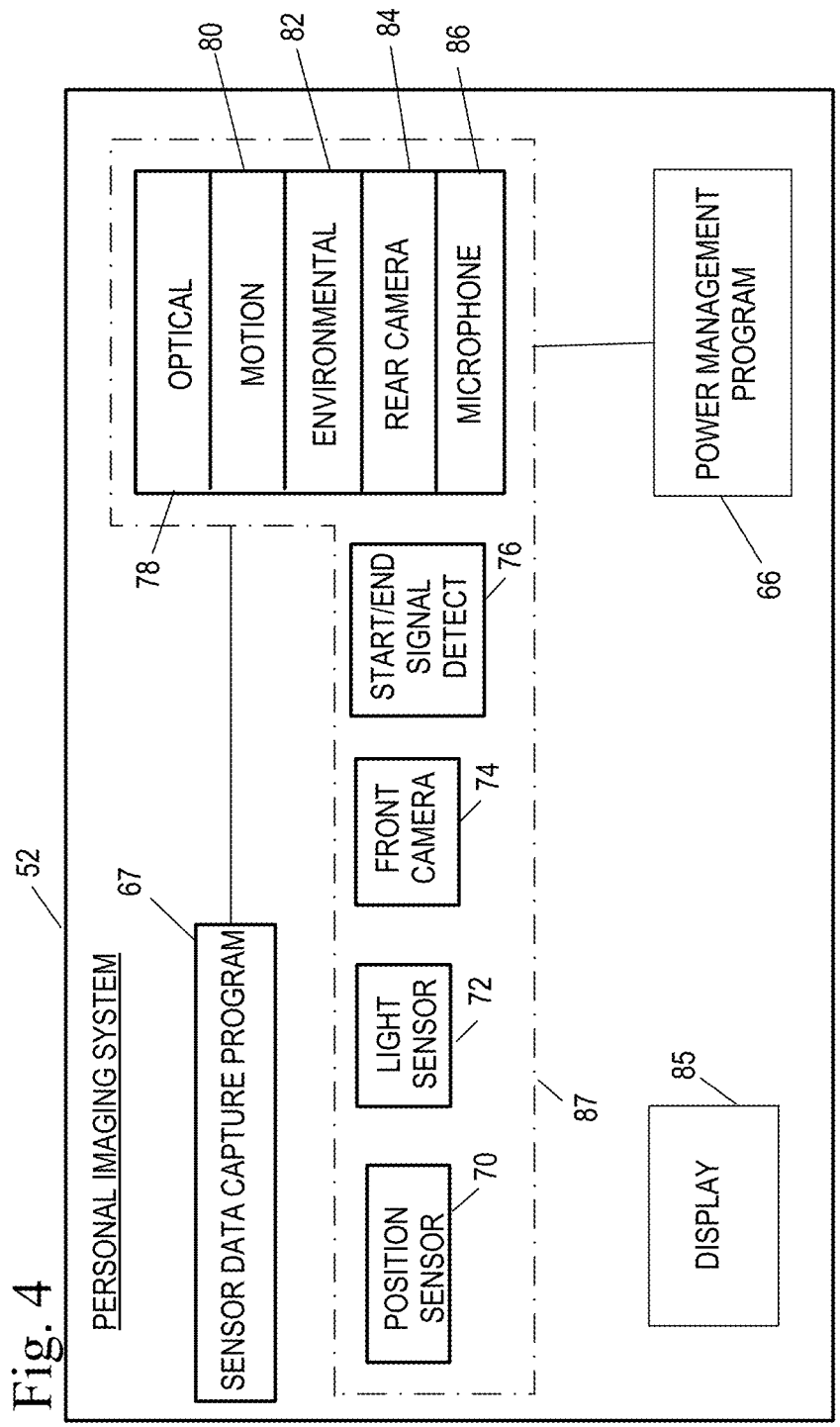
FIG. 4 shows a schematic of components of the personal imaging device.

Referring to FIGS. 1 and 4, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a personal imaging device 52, a mobile device 56, a repository 53, and a server computer 54 connect to network 50. In other exemplary embodiments, network data processing system 51 may include additional client or device computers, storage devices or repositories, server computers, and other devices not shown.

The personal imaging device 52 may be, for example a personal imaging device with a personal imaging system.

The personal imaging device 52 may contain an interface, which may accept commands and data entry from a user. The interface can be, for example, a command line interface, a graphical user interface (GUI), a natural user interface (NUI) or a touch user interface (TUI). The personal imaging device 52 preferably includes a power management program 66 and a sensor data capture program 67. Alternatively, the power management program 66 may include the sensor data capture program 67. While not shown, it may be desirable to have the power management program 66 and the sensor data capture program 67 be present on the server computer 54. While a personal imaging device and mobile device are shown, other devices may be used.

FIG. 4 shows a schematic of a personal imaging system 52. The personal imaging system 52 includes a display 85, a power management program 66, and a sensor data capture program 67, and a plurality of sensors 87. The sensors 87 may include, but is not limited to a position sensor 70, a light sensor 72, a front camera 74, a start/end signal detect sensor 76, an optical sensor 78, motion sensor 80, environmental sensor 82, rear camera 84, and a microphone 86. The position sensor 70 may include a gyroscope. The power management program 66 and the sensor data capture program 67 both interface with the plurality of sensors 87.

Figure 5:
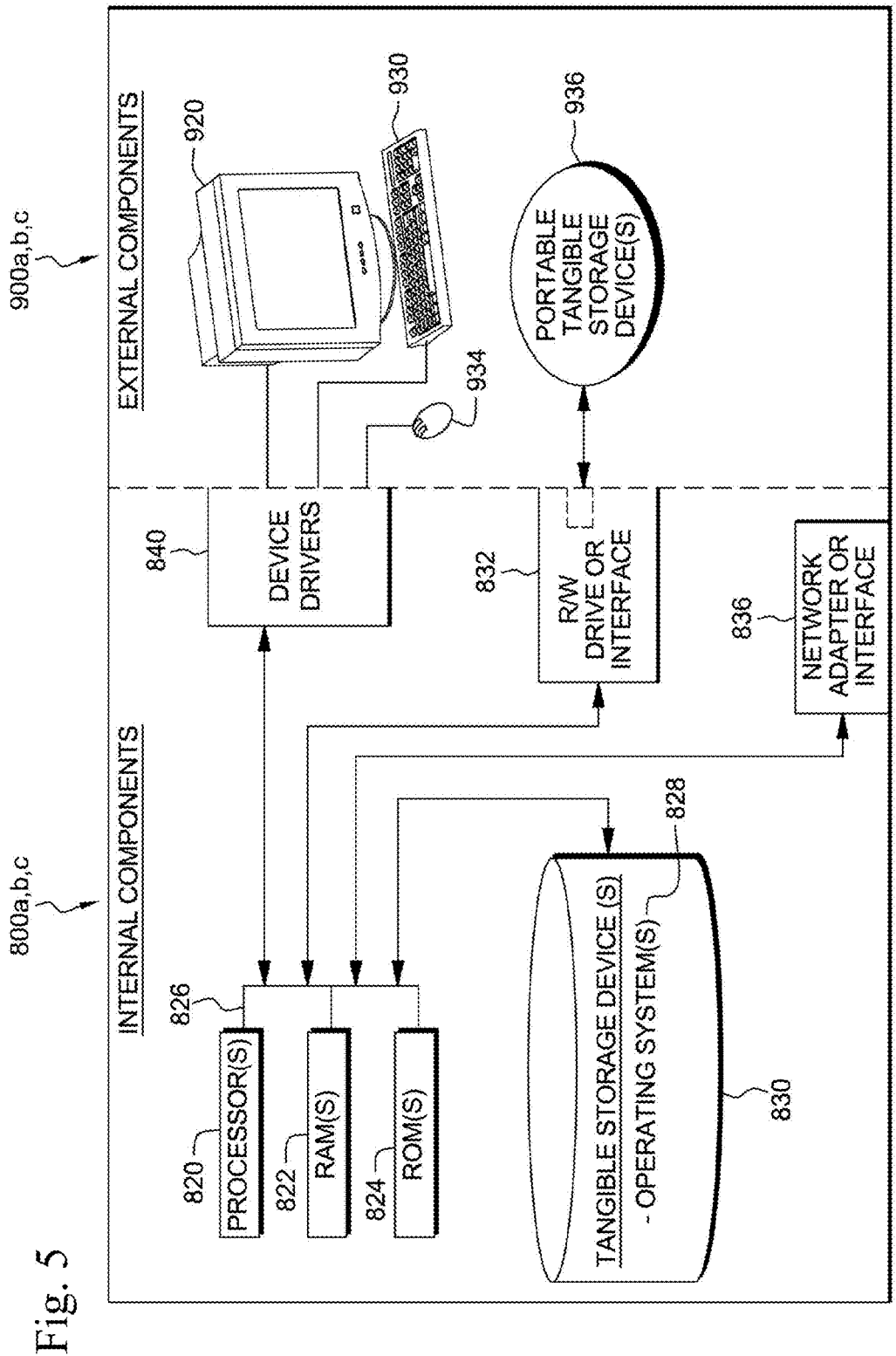
FIG. 5 illustrates internal and external components of a mobile device and a personal imaging device and a server computer in which illustrative embodiments may be implemented.

The personal imaging device 52 includes a set of internal components 800a and a set of external components 900a, further illustrated in FIG. 5.

The mobile device 56 may be, for example, a mobile phone, a personal digital assistant (PDA), a netbook, a laptop computer, a tablet computer, a desktop computer, or any other type of computing device.

The mobile device 56 may contain an interface 57. The interface 57 may accept commands and data entry from a user. The interface 57 can be, for example, a command line interface, a graphical user interface (GUI), a natural user interface (NUI) or a touch user interface (TUI). The mobile device 56 preferably includes a power management program 66 and a data monitor program 68. While not shown, it may be desirable to have the power management program 66 and the data monitor program 68 may be present on the server computer 54. The mobile device 56 includes a set of internal components 800c and a set of external components 900c, further illustrated in FIG. 5.

Server computer 54 includes a set of internal components 800b and a set of external components 900b illustrated in FIG. 5. In the depicted example, server computer 54 provides information, such as boot files, operating system images, and applications to the personal imaging device and mobile device 52, 56. Server computer 54 can compute the information locally or extract the information from other computers on network 50.

In an illustrative embodiment of the present invention, it is recognized that a method of using a visual start and end signal to activate a program may be used to start and end any program that requires extensive process power and battery resources. The amount of processing power and battery resources may be defined by a user of predetermined. The visual start and end codes may be used to activate and halt the program, therefore reducing the resources used by both the processor and battery, improving the function of the processor and the battery life of the device.

Figure 2:
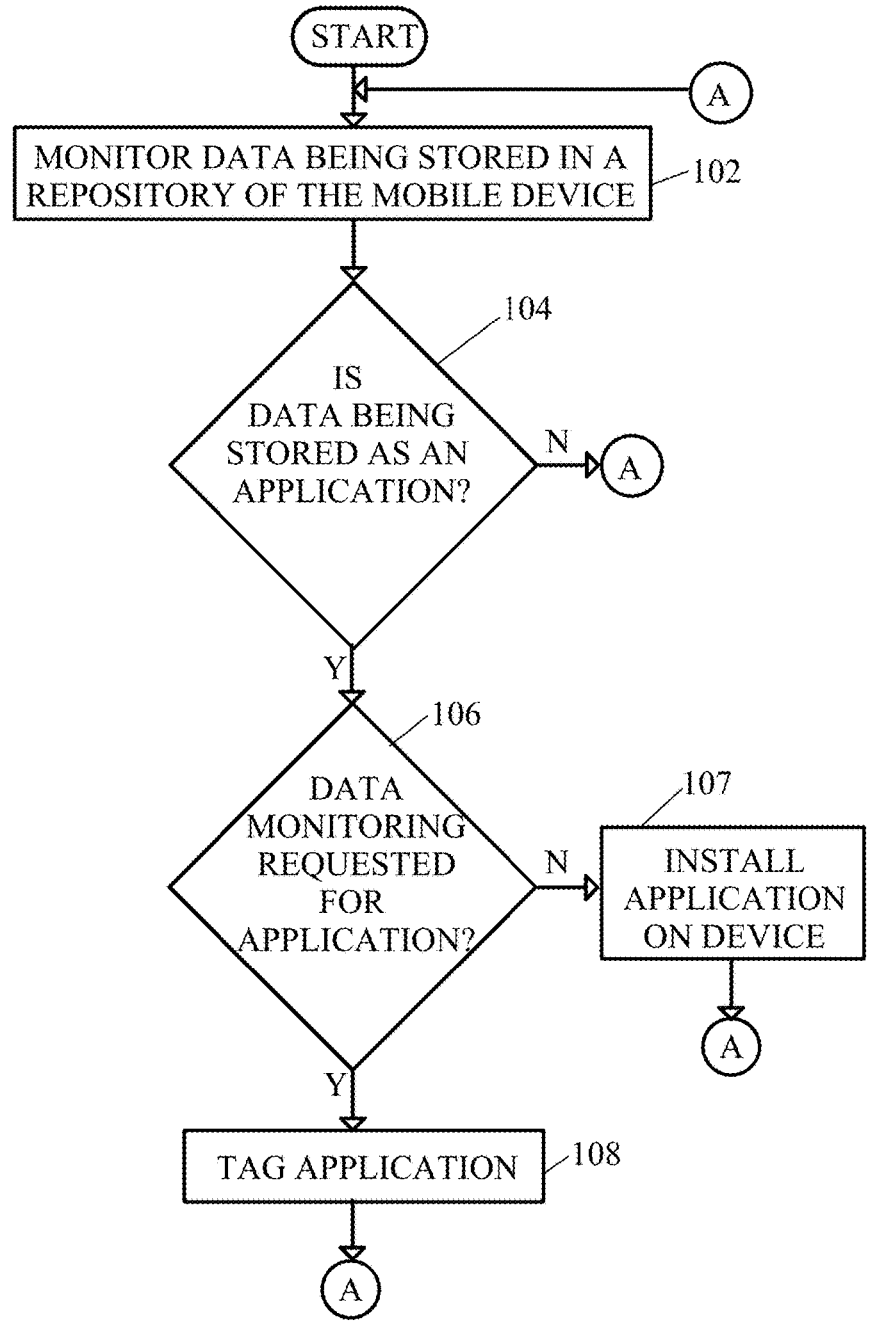
FIG. 2 shows a flow diagram of a method of monitoring for applications being downloaded to a mobile device.

FIG. 2 shows a flow diagram of a method of monitoring for applications being downloaded to a mobile device.

In a first step, a data monitor program 68 of the mobile device 56, monitors data being stored in a repository of the mobile device 56 (step 102). The data is preferably an application or program to be installed on the mobile device 52 for use by the user.

If the data being stored in the repository of the mobile device 56 (step 104) is not an application or program, the method returns to step 102.

If the application is not one in which data monitoring is requested (step 106), the application is installed onto the repository of the mobile device (step 107) and the method returns to step 102.

If the application is one in which data monitoring is requested (step 106), the application is tagged (step 108).

The tagging of the application will cause the mobile device 56 to treat the application as one for which data collection is desired. Then, each time the tagged application is opened or closed, the data monitor program 68 displays a visual start signal or visual end signal such as a QR code to the user of the mobile device.

A visual start signal preferably includes a trigger that activates any remaining sensors that are not currently activated in the personal imaging device 52 as well as a power management program which manages processor intensive software or programs, for example for the personal imaging system. An example of a processor intensive program may be data collection through the sensors of the personal image device. Furthermore in the case of data collection, the visual start signal can include a start time for data collection that can be used to sync the time assigned by the personal imaging device 52 to the data being collected to the time the mobile device 56 has assigned to the data as it is being displayed by the mobile device 56. The visual start signal may include an application id number and where to send any data sensed or collected.

A visual end signal preferably includes a trigger that deactivates some or all sensors of the personal imaging device 52. Furthermore in the case of data collection, the visual end signal may include an end time for data collection that can be used to the time assigned by the personal imaging device 52 to the data being collected to the time the mobile device 56 has assigned to the data as it is being displayed by the mobile device 56.

Figure 3A:
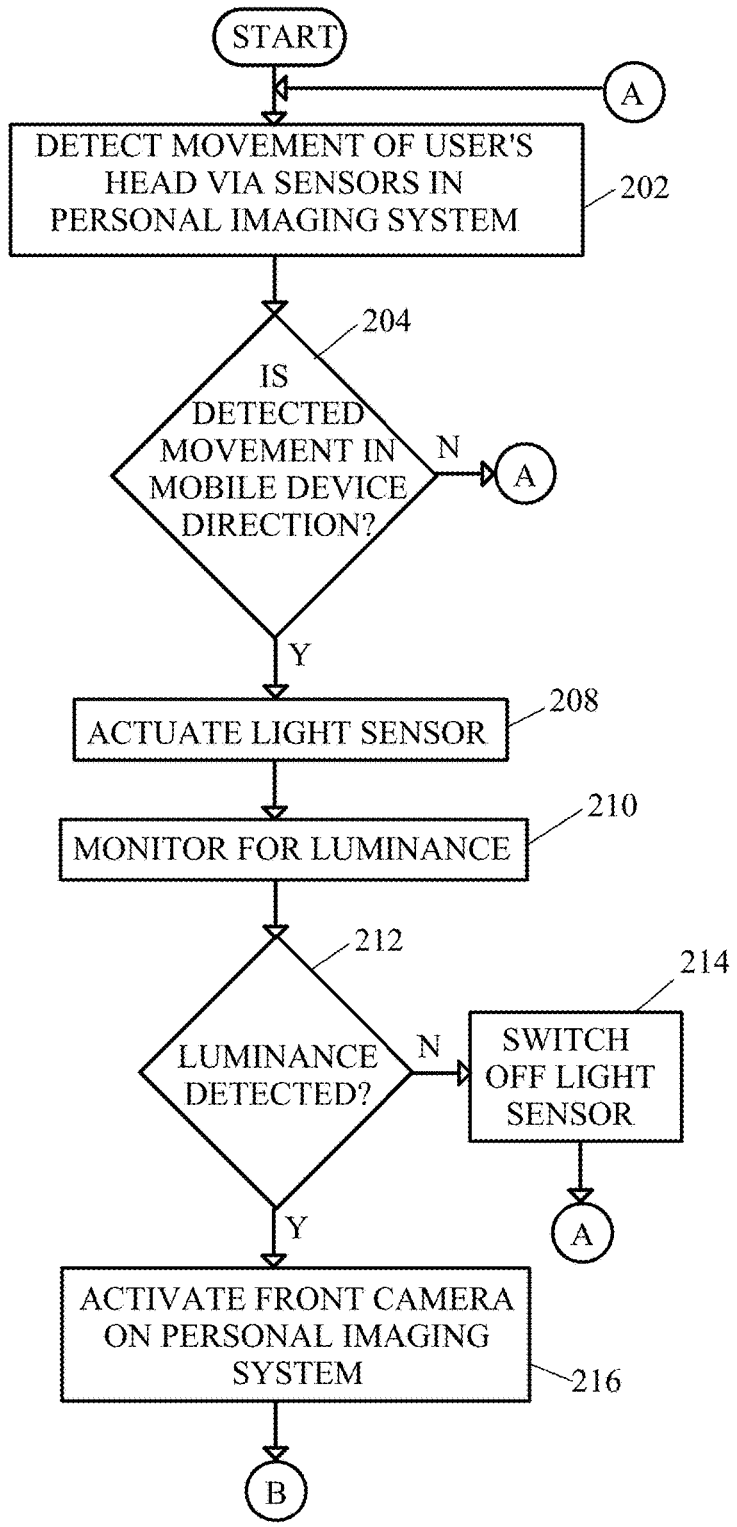
FIGS. 3A-3C show a flow diagram of a method of minimizing power resources of a personal imaging device.
Figure 3B:
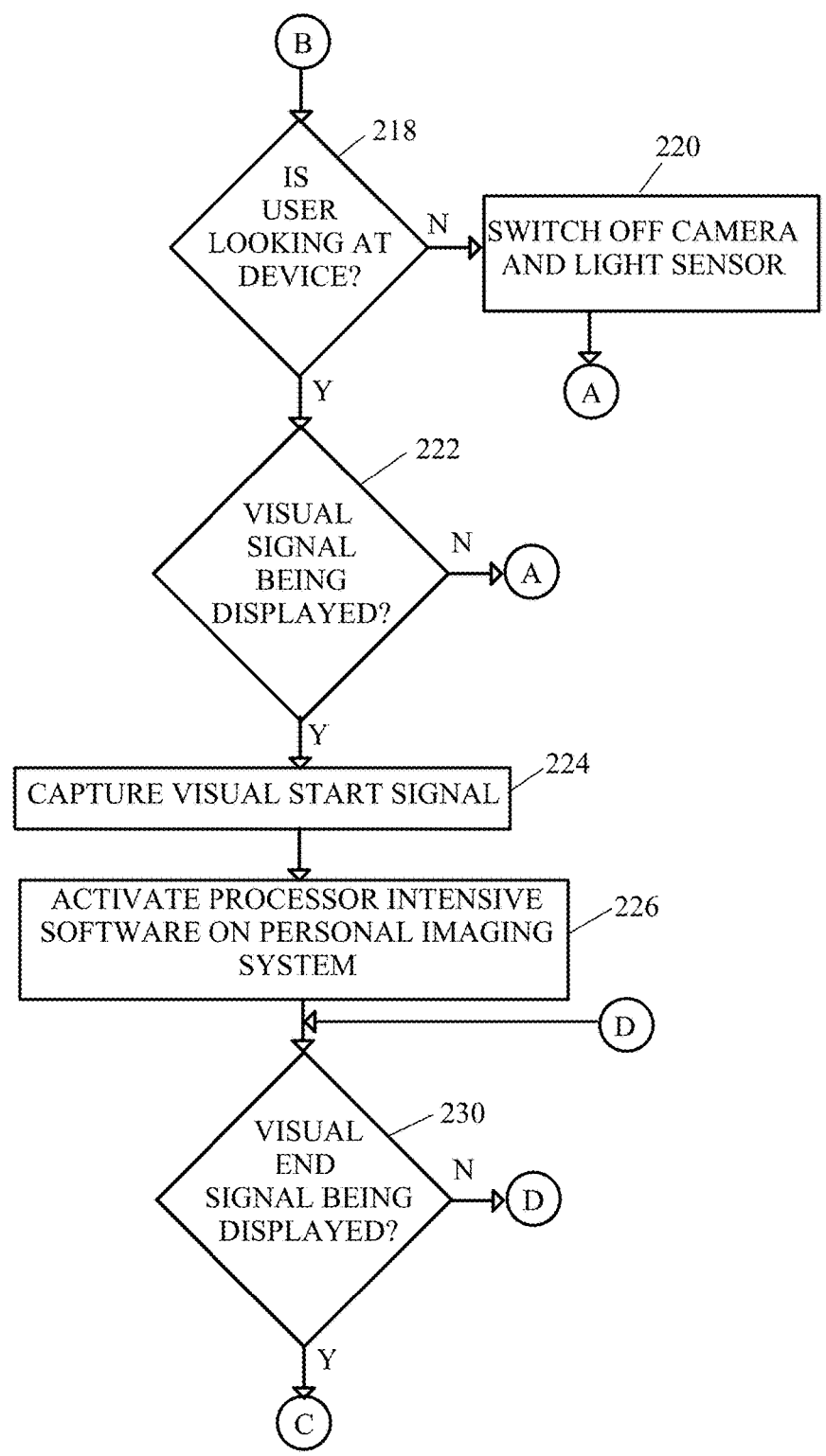
Figure 3C:
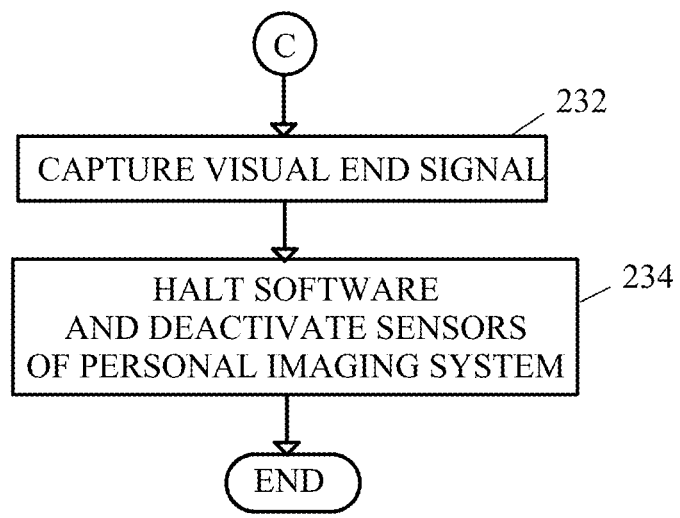

It should be noted that the method of FIG. 2 takes place prior to the method of FIGS. 3A-3C.

FIGS. 3A-3C show a flow diagram of a method of minimizing power resources of a personal imaging device 52 of data regarding use of a tagged application on a mobile device 56.

In a first step, the sensor data capture program 67 of the personal imaging device 52, which is being worn by the user, detects movement of the user's head via sensors 87 of the personal imaging device (step 202).

If the movement indicates that the user is moving their head in a direction other than one which would indicate that the user is looking at the mobile device 56 (i.e. usually downwards), the method returns to step 202.

If the movement indicates that the user is moving their head to look at the mobile device, a light sensor of the personal imaging device 52 is actuated (step 208), for example by the sensor data capture program 67.

The sensor data capture program 67 may optionally monitor for luminance (or an increase in luminance) using the activated light sensors of the personal imaging device 52, which would indicate that the user is looking at the illuminated screen of the mobile device 56 (step 210).

If the sensor data capture program 67 of the personal imaging device 52 does not detect luminance (step 212), the light sensor of the personal imaging device is deactivated and the method returns to step 202.

If the sensor data capture program 67 of the personal imaging device 52 detects luminance through the light sensors (step 212), the front camera of the personal imaging device is activated (step 216). Alternatively, if step 210 is not implemented, the screen of the mobile device 56 (or the presence of a defined code or signal or display on the mobile device, such as the visual start code) could be detected by the front camera itself.

If the user is not looking at the mobile device (step 218), which can be determined using the active front camera, the front camera sensor is deactivated and the method returns to step 202.

If the user is looking at the mobile device (step 218), and a visual start signal is not available for capture by the personal imaging system (step 222), the sensors are deactivated and the method returns to step 202.

If the user is looking at the mobile device (step 218), and a visual start signal is being displayed by the mobile device (step 222), the sensor data capture program 67 captures the visual start signal (step 224).

Detection of the display of a visual start signal activates at least some of the remaining sensors of the personal imaging device (step 226), for example through the power management program 66. The remaining sensors include, but are not limited to optical sensors 78, motion sensors 80, environmental sensors 82, a rear camera 84, a microphone 86.

Processor intensive software runs until a visual end signal is displayed on the mobile device 56, indicating that the tagged application has ended (step 230). When a visual end signal is detected, data collection is halted and at least some of the sensors of the personal imaging device are deactivated (step 232). Additionally, the personal imaging device may capture the visual end signal and store data encoded in the visual end signal in the repository with any collected data.

In an example, if the processor intensive program was for data collection regarding a user's interaction with an application on a mobile device, the processor would collect data via the sensors of the personal imaging device in reference to the application running on the mobile device and the user's interaction with the application, and store the data in repository. The data is preferably stored in a repository of the personal imaging device. The data may be time-stamped with a time synchronized to the mobile device by data in the visual start signal, as noted above. Data collection would continue until the visual end signal is displayed. Data collected may then be sent to a server computer.

Since the personal imaging device need not be wirelessly linked with or radio linked with the mobile device, the power used for data collection can be significantly reduced in the personal imaging device and the mobile device.

Optionally, in order for the personal imaging system to optimize the power being used, a majority of the sensors need not be activated until the system has determined whether data collection is actually being initialized by the user. During the initialization process, power can also be optimized by activating only the sensors required to determine whether data collection is actually being initialized by the user.

FIG. 5 illustrates internal and external components of a personal imaging device 52, a mobile device 56, and server computer 54 in which illustrative embodiments may be implemented. In FIG. 5, a personal imaging device 52, server computer 54, and a mobile device 56 include respective sets of internal components 800*a*, 800*b*, 800*c* and external components 900*a*, 900*b*, 900*c*. Each of the sets of internal components 800*a*, 800*b*, 800*c* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, data monitor program 68, power management program 66, and sensor data capture program 67 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a*, 800*b*, 800*c* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Power management program 66, data monitor program 68, and sensor data capture program 67 can be stored on one or more of the portable computer-readable tangible storage devices 936, read via R/W drive or interface 832 and loaded into hard drive 830.

Each set of internal components 800*a*, 800*b*, 800*c* also includes a network adapter or interface 836 such as a TCP/IP adapter card. Power management program 66 and sensor data capture program 67 can be downloaded to the personal imaging device 52 and server computer 54 from an external computer via a network (for example, the Internet, a local area network or other, wide area network) and network adapter or interface 836. From the network adapter or interface 836, power management program 66 and sensor data capture program 67 is loaded into hard drive 830. Power management program 66 and data monitor program 68 can be downloaded to the mobile device 56 and server computer 54 from an external computer via a network (for example, the Internet, a local area network or other, wide area network) and network adapter or interface 836. From the network adapter or interface 836, power management program 66 and data monitor program 68 is loaded into hard drive 830. The network may comprise copper wires, optical fibers, wireless transmission, routers, firewalls, switches, gateway computers and/or edge servers.

Each of the sets of external components 900*a*, 900*b*, 900*c* includes a computer display monitor 920, a keyboard 930, and a computer mouse 934. Each of the sets of internal components 800*a*, 800*b*, 800*c* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Power management program 66, data monitor program 68, and sensor data capture program 67 can be written in various programming languages including low-level, high-level, object-oriented or non object-oriented languages. Alternatively, the functions of a power management program 66, sensor data capture program 67, and data monitor program 68 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of data collection by a personal imaging device regarding a user's interaction with an application on a mobile device, comprising the steps of:
   the personal imaging device detecting movement of the user's head in a determined direction through a position sensor of the personal imaging device, the determined direction indicating the user looking at the mobile device;
   the personal imaging device capturing an image of a display of the mobile device;
   the personal imaging device analyzing the image of the display of the mobile device to detect a visual start signal within the image displayed on the display of the mobile device;
   the personal imaging device activating sensors of the personal imaging device for collecting data regarding the user's interaction with the application on the mobile device;
   the personal imaging device collecting data regarding the user's interaction with the application on the mobile device via the activated sensors and storing the data in a repository;
   the personal imaging device detecting a visual end signal within the image displayed on the display of the mobile device; and
   the personal imaging device deactivating at least some of the sensors of the personal imaging device.

2. The method of claim 1, wherein the personal imaging device is a personal imaging system.

3. The method of claim 1, wherein after
the personal imaging device detects the movement of the user's head in a determined direction through the position sensor of the personal imaging device, the personal imaging device activating at least one sensor.

4. The method of claim 3, in which the sensor is a light sensor; and the method further comprises the steps of:
the personal imaging device monitoring for luminance through the light sensor; and
the personal imaging device activating a front camera upon detecting luminance through the light sensor.

5. The method of claim 3, in which the sensor is a front camera of the personal imaging device.

6. The method of claim 3, wherein the sensor is a light sensor, and the light sensor monitors for increased luminance to determine when the user is looking at the screen of the mobile device.

7. The method of claim 1, further comprising tagging at least one application stored in a repository of a mobile device by the steps of:
the mobile device monitoring data being stored in the repository of the mobile device;
if the data being stored is an application for which data monitoring is desired, the mobile device tagging the application.

8. The method of claim 7, further comprising, each time a tagged application is opened or closed, the mobile device displaying a visual signal.

9. The method of claim 8, wherein when the application is opened, the mobile device displays a visual start signal within the image being displayed on the mobile device.

10. The method of claim 8, wherein when the application is closed, the mobile device displays a visual end signal within the image being displayed on the mobile device.

11. The method of claim 1, wherein the data regarding the user's interaction with the application on the mobile device comprises usability data used to determine a user experience when the user interacts with the application on the mobile device.

12. The method of claim 1, wherein the personal imaging device activating the sensors of the personal imaging device for collecting data regarding the user's interaction with the application on the mobile device occurs in response to the personal imaging device detecting the visual start signal, and wherein the personal imaging device deactivating at least some of the sensors of the personal imaging device occurs in response to detecting the visual end signal.

13. The method of claim 1, wherein the visual start signal includes a trigger that activates any remaining inactivated sensors of the personal imaging device.

14. The method of claim 1, wherein the visual start signal includes an application identification number and a destination location to send any data sensed or collected.

15. A method of minimizing power resources of a personal imaging device regarding a user's interaction with an application on a mobile device, comprising the steps of:
the personal imaging device capturing an image of a display of the mobile device;
the personal imaging device analyzing the image of the display of the mobile device to detect a visual start signal within the image displayed on the display of the mobile device, wherein the visual start signal includes a trigger that activates any remaining inactivated sensors of the personal imaging device;
the personal imaging device activating a processing and resource intensive program regarding the user's interaction with the application on the mobile device;
the personal imaging device detecting a visual end signal within the image displayed on the display of the mobile device, ending the processing and resource intensive program; and
the personal imaging device deactivating at least some of the sensors of the personal imaging device.

16. The method of claim 15, wherein prior to the personal imaging device capturing the visual start signal, further comprising the steps of:
the personal imaging device detecting movement of the user's head in a determined direction through a position sensor of the personal imaging device; and
the personal imaging device activating at least one sensor.

17. The method of claim 16, in which the sensor is a light sensor; and the method further comprises the steps of:
the personal imaging device monitoring for luminance through the light sensor; and
the personal imaging device activating a front camera upon detecting luminance through the light sensor.

18. The method of claim 16, in which the sensor is a front camera of the personal imaging device.

19. The method of claim 15, further comprising tagging at least one application stored in a repository of a mobile device by the steps of:
the mobile device monitoring data being stored in the repository of the mobile device;
if the data being stored is an application for which data monitoring is desired, the mobile device tagging the application.

20. The method of claim 19, further comprising, each time a tagged application is opened or closed, the mobile device displaying a visual signal.

21. The method of claim 20, wherein when the application is opened, the mobile device displays a visual start signal within the image of the mobile device.

22. The method of claim 20, wherein when the application is closed, the mobile device displays a visual end signal within the image of the mobile device.

23. The method of claim 15, further comprising the steps of:
prior to the personal imaging device capturing the visual start signal, the personal imaging device detecting movement of the user's head in a determined direction through a position sensor of the personal imaging device, the determined direction indicating the user looking at the mobile device;
as a result of the personal imaging device detecting movement of the user's head in the determined direction and the personal imaging device detecting the visual start signal, the personal imaging device activating sensors of the personal imaging device for collecting data regarding the user's interaction with the application on the mobile device.

24. A computer program product for data collection by a personal imaging device regarding a user's interaction with an application on a mobile device, the personal imaging system comprising at least one processor, one or more memories, one or more computer readable storage media, a plurality of sensors, the computer program product comprising a computer readable storage medium having program instructions embodied therewith, the program instructions executable by the computer to perform a method comprising:
detecting, by the personal imaging device, movement of the user's head in a determined direction through a position sensor of the personal imaging device, the determined direction indicating the user looking at the mobile device;

capturing, by the personal imaging device, an image of a display of the mobile device;

analyzing, by the personal imaging device, the image of the display of the mobile device to detect a visual start signal within the image displayed on the display of the mobile device;

activating, by the personal imaging device, sensors of the personal imaging device for collecting data regarding the user's interaction with the application on the mobile device;

collecting, by the personal imaging device, data regarding the user's interaction with the application on the mobile device via the activated sensors and storing the data in a repository;

detecting, by the personal imaging device, a visual end signal within the image displayed on the display of the mobile device;

deactivating, by the personal imaging device, at least some of the sensors of the personal imaging device.

\* \* \* \* \*